United States Patent [19]

Friese

[11] 4,324,434
[45] Apr. 13, 1982

[54] GRAIN CARRYING VEHICLE

[76] Inventor: Wayne G. Friese, Rte. 3, Box 150, Devils Lake, N. Dak. 58301

[21] Appl. No.: 103,366

[22] Filed: Dec. 13, 1979

[51] Int. Cl.³ .............................................. B60P 1/56
[52] U.S. Cl. ................................. 298/27; 105/282 R; 280/154.5 R; 280/163; 298/8 H
[58] Field of Search ..................... 298/24, 25, 6, 26, 27, 298/5, 28, 29, 30, 31, 8 H, 8 T, 32, 33, 34, 35 R, 35 M, 36, 37, 8 R; 105/240, 248, 254, 282 R, 282 A, 282 P, 457, 436; 296/184; 280/154.5, 163, 789; 222/504

[56] References Cited

U.S. PATENT DOCUMENTS

| | | |
|---|---|---|
| 763,706 | 6/1904 | Wolff et al. . |
| 1,442,650 | 1/1923 | Coppock . |
| 1,570,292 | 1/1926 | Wade ................................. 105/457 |
| 1,889,605 | 11/1932 | Jones ................................. 105/457 |
| 2,072,787 | 3/1937 | Anderson . |
| 2,121,153 | 6/1938 | Konicek . |
| 2,499,925 | 3/1950 | Lockenvitz . |
| 2,544,117 | 3/1951 | Weatherly . |
| 2,555,288 | 5/1951 | Kruger . |
| 2,816,797 | 12/1957 | Hanson ........................... 105/282 R |
| 2,901,984 | 9/1959 | Dorey ................................. 298/28 X |
| 3,088,774 | 5/1963 | Bernstein et al. ................. 298/27 |
| 3,413,032 | 11/1968 | Dendy . |
| 3,578,806 | 5/1971 | Tonelli .............................. 280/789 X |
| 3,612,555 | 10/1971 | Baker . |
| 4,009,906 | 3/1977 | Sweet et al. ......................... 298/27 |
| 4,139,230 | 2/1979 | Barrentine et al. . |

OTHER PUBLICATIONS

Bocats Inc. Brochure for its Hopper Bottom Grain Trailer.
Double B Trailers Brochure for UNI-PUP.
Photograph of Westgo Farm & Truck Equipment Grain Carrying Vehicle.
Crysteel Mfg. Inc. Brochure for Truck PUP Trailers.
Double B Trailers Brochure for Imperial 400 PUP.
IDSO Sales, Inc. Advertising for D & B Farm PUP.
Double B Trailers Advertising for P-18000 PUP.

*Primary Examiner*—Leslie J. Paperner
*Attorney, Agent, or Firm*—Merchant, Gould, Smith, Edell, Welter & Schmidt

[57] ABSTRACT

An improved grain carrying vehicle (10) is the subject of this application. The vehicle (10) includes a catwalk (54) formed between an oblique panel portion (42) of the vehicle carriage (34) and a generally horizontal fender panel (52). Additionally, the carriage (34) includes an open discharge portion (38) which extends down between a base frame or chassis (12) mounted for movement over the ground.

8 Claims, 8 Drawing Figures

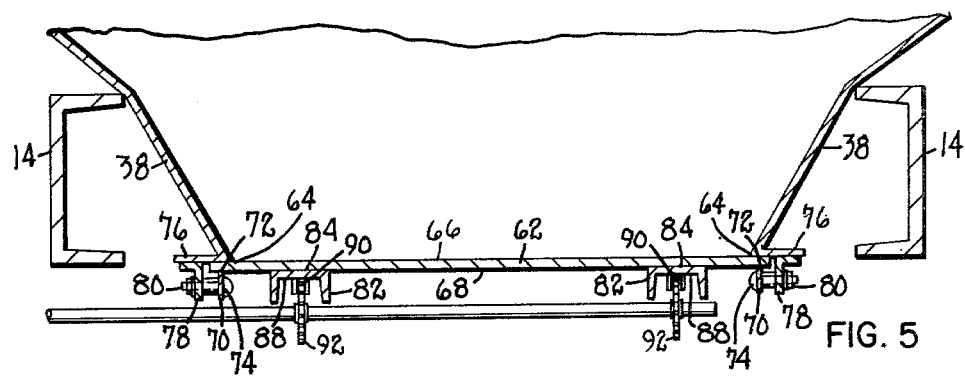
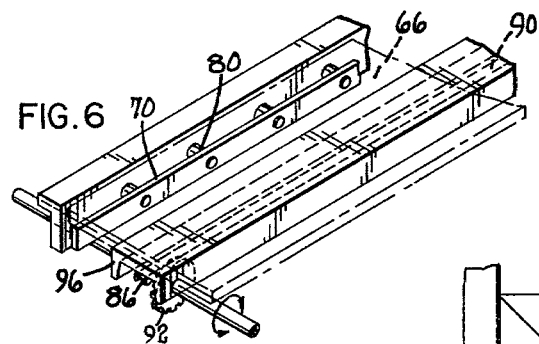
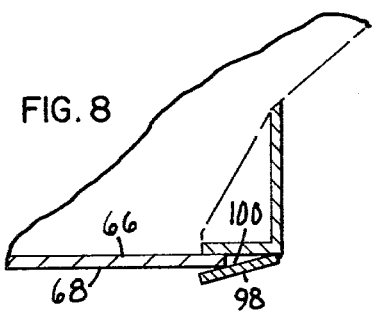
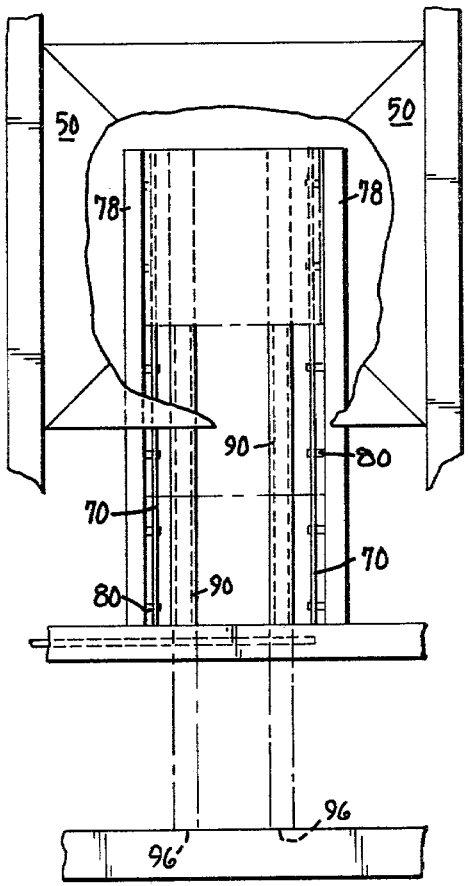

GRAIN CARRYING VEHICLE

TECHNICAL FIELD

The invention of the present application refers broadly to the field of transporting vehicles. More specifically, however, it is concerned with vehicles for carrying grain or other particulate or granular materials. In a preferred embodiment, the invention relates to a non-motorized vehicle for accomplishing this task.

Background of Prior Art

Vehicles for transporting particulate and granular materials such as grain and other bulk commodities are known in the art. Such vehicles are known as being of various sizes and shapes. Vehicles for carrying such materials may be either motorized or non-motorized. Non-motorized structures are generally configured for towing by a tractor or other powered vehicle.

Frequently, maximization of size of the vehicle is a significant objective sought to be obtained in the design of such structures. Although volume need not always be a goal of the designer of the vehicle, large capacity enables the transportation of significant volumes of the particulate or granular material while yet minimizing the number of vehicles or "trips" necessary to effect transfer of the total volume of matter from one location to another.

In attempting to maximize the capacity of such vehicles, certain constraints limit the size beyond which the capacity can be increased. The width of the vehicle can be increased in order to increase the carrying capacity of the vehicle. Statutory restraints, however, impose dimensional limits which any vehicle being utilized on public highways cannot exceed.

Similar obstacles are encountered by the designers of such vehicles with regard to length and height of the structures also. Safety is a primary objective of laws regulating these dimensional characteristics of particulate or granular material carrying vehicles. Particularly in the situation of a non-motorized vehicle which is being towed by a tractor, an exceedingly long tow restricts the maneuverability of the tow and the control which the operator of the tractor can exert over the load.

Similarly, control and safety in operation are sacrificed by increasing the height of the vehicle. As the height is increased, the center of gravity is raised and some measure of stability is relinquished. The loss of stability is particularly acute when the base of the vehicle is already relatively small as in the case of grain hauling vehicles used by farmers in transporting their harvests to grain elevators.

Another design objective in conflict with the goal of maximizing capacity is providing access to a sampler of the cargo transported by the vehicle. By positioning catwalks along the sides of the vehicle, limitations are thereby imposed upon the width of the material carrying body portion of the vehicle in order to meet statutory constraints as to overall width of the vehicle. In structures in which catwalks are positioned along the front of the vehicle, along the rear of the vehicle, or both, access to the full volume of the contents of the vehicle is frequently precluded because of vehicle length. With structures of this type, only that portion of the contents of the vehicle disposed either near the front or rear ends of the structure is capable of being sampled.

Another problem extant in the particulate or granular material carrying vehicle art is the jamming of dump doors disposed at or near the base of the material-carrying body portion. Vehicles are constructed including such doors to facilitate the emptying of the vehicles at the location where the cargo carried is to be unloaded. By opening these doors, unloading is effected by gravity drain.

Because of the nature of the commodities carried by this type of vehicle, dump door devices presently in use are susceptible to clogging and binding in either an open or closed position. This is particularly true in vehicles having opening devices which include narrow slots in which the door slides and other functional components which are exposed to clogging by the particulate or granular matter as it is permitted to drain.

It is these problems in the art which the invention of the present application is designed to overcome. The invention provides a structure which affords greater load capabilities while, at the same time, providing access to the total volume of material carried in the vehicle to a sampler. Additionally, it provides a structure which prevents clogging and jamming of the dump doors, even in view of the particulate or granular nature of the intended cargo.

BRIEF SUMMARY OF THE INVENTION

The present invention is an improved vehicle for transporting grain or other particulate material. The vehicle includes a base frame or chassis. This base frame or chassis includes at least two chassis support elements. These elements are spaced from one another laterally to form a channel therebetween. The frame or chassis is mounted to a means which facilitates movement of the chassis over the ground. The base frame supports a carriage in which the grain or particulate material is transported. At least a portion of the carriage extends down between the chassis support elements. The carriage includes a portion oriented obliquely, that is neither parallel nor perpendicular, with respect to the ground surface. The oblique portion of the carriage extends simultaneously upwardly and outwardly with respect to the body of the carriage. A generally horizontal panel is mounted beneath this obliquely disposed portion of the carriage. The generally horizontal panel together with the obliquely disposed portion of the carriage form a catwalk along the side of the vehicle.

In certain embodiments, the frame can be supported for movement over the ground by a tandem wheel arrangement. By using a tandem arrangement, a towing tongue can be rigidly mounted to the base frame and extend forwardly of the vehicle elevated off the ground in order to facilitate hook-up to the towing tractor. The tongue can be mounted to the base frame with a portion extending forwardly at a height below that of the frame. Such a configuration serves to lower the center of gravity of the overall vehicle.

In embodiments utilizing pairs of wheels in tandem, the generally horizontal panel can serve as a fender panel for wheels on one side of the vehicle. To give the vehicle a degree of symmetry, it can be similarly configured on both sides. That is, a catwalk formed by an obliquely disposed portion of the carriage and a generally horizontal fender panel can be positioned on either side.

In order to afford selective discharge of only a portion of the contents of the carriage, the carriage can be of a construction having two separate bins. Each bin can have its own discharge opening located near the bottom thereof to permit gravity drain of the cargo out of the bin.

The invention of this application is thus an improved vehicle for carrying grain or other particulate material. The specific advantages of the invention will become apparent with reference to the accompanying drawing, detailed description of the invention, and claims.

BRIEF DESCRIPTION OF THE DRAWINGS

FIG. 5 is an enlarged fragmentary view in section of a bin in accordance with the present invention;

FIG. 6 is an enlarged fragmentary perspective view of a portion of the bin door opening mechanism in accordance with the present invention;

FIG. 7 is a fragmentary top plan view, some portions broken away; and

FIG. 8 is an enlarged fragmentary side sectional view of a portion of a bin.

DESCRIPTION OF THE PREFERRED EMBODIMENT

Figure 1:
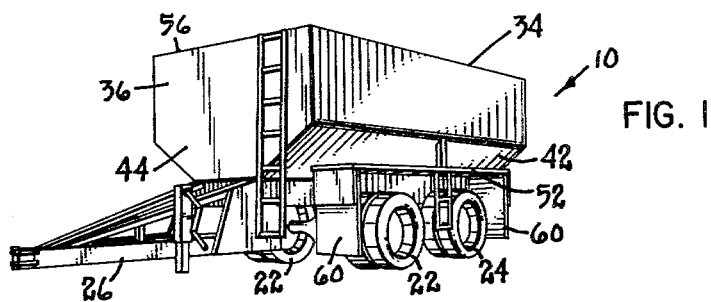
FIG. 1 is a view in perspective of one embodiment of the present invention.
Figure 2:
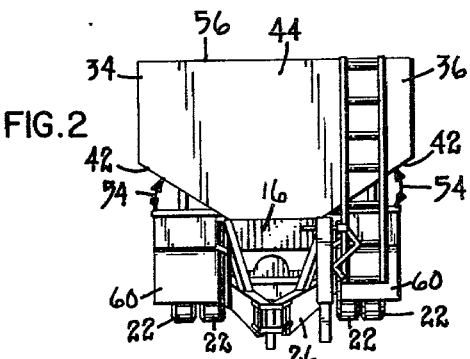
FIG. 2 is a front elevational view of the embodiment of FIG. 1.

Referring now to the drawings wherein like reference numerals denoted like elements throughout the several views, FIGS. 1-4 illustrate a preferred embodiment of a vehicle 10 for carrying grain or other particulate matter in accordance with the present invention. The vehicle 10 includes a base frame or chassis 12. The base frame 12 has two laterally spaced support elements 14, 14'. In the preferred embodiment illustrated, the support elements 14, 14' are rigidly oriented with respect to one another by a pair of interconnecting members or braces. The frame includes a front brace 16 and a rear brace 18. Characterization of these two members is made with respect to an intended direction of travel of the vehicle 10 as indicated by the arrow 20.

The vehicle 10 further includes means for mounting the chassis 12 for movement over the ground. In the preferred embodiment illustrated in FIGS. 1-4, the mounting means includes two pairs of wheels 22, 24 in tandem. It is not intended, however, that such a configuration be exclusive. The invention specifically contemplates embodiments wherein either more or less than the two pairs of wheels illustrated are used. In fact, the invention contemplates embodiments wherein the chassis 12 is mounted for movement over the ground by a method other than wheels.

When wheels are used, however, they can be affixed to the chassis 12 by any number of methods. These methods of affixation are known in the art, and will not be discussed herein for the sake of brevity.

Figure 3:
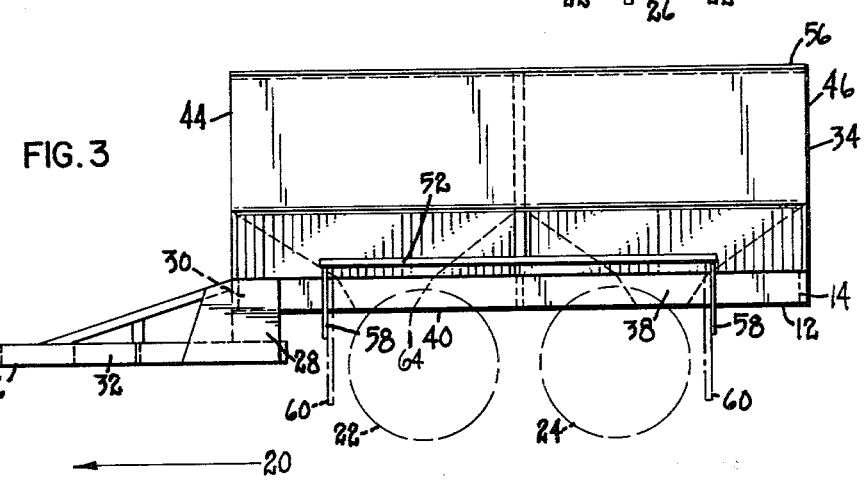
FIG. 3 is a side elevational view of the embodiment of FIG. 1.
Figure 4:
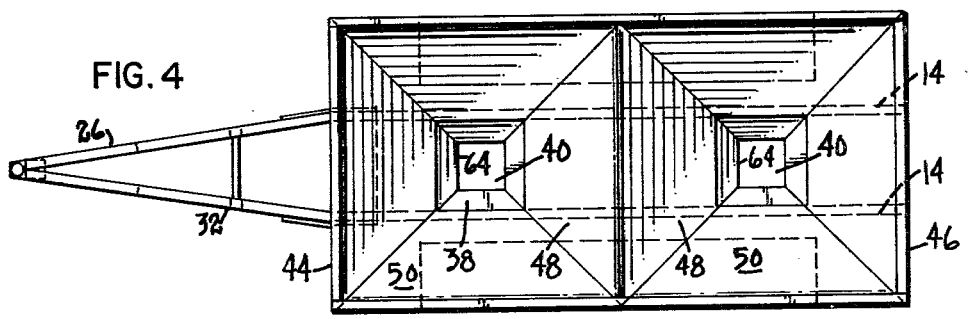
FIG. 4 is a top plan view of the embodiment of FIG. 1.

It will be understood by those of skill in the art that the present invention encompasses both motorized and non-motorized vehicles. FIGS. 1-4 illustrate a non-motorized embodiment. Such an embodiment is typically used on a farm and would appropriately be towed by a tractor (not shown). In such a case, the vehicle 10 would incorporate an element such as a tongue 26 to transmit the motion over ground of the towing tractor to the grain hauling vehicle 10. FIGS. 3 and 4 illustrate the tongue 26 as extending forwardly from the vehicle 10 with respect to the intended direction of travel 20. It is, however, within the scope of the invention to mount a means for transmitting the motion from the powered vehicle at the rear of the cargo carrying vehicle 10. In such an embodiment, the load would be pushed by the powered vehicle rather than pulled.

The tongue 26 can be rigidly mounted to the base frame 12 and extend in any desired orientation therefrom. FIG. 3 shows an attachment portion 28 of the tongue 26 abutting the frame and extending generally vertically downward from the forward end 30 of the frame 12. By having the tongue 26 oriented horizontally and parallel to the ground, the motive force generated by the power towing vehicle can most efficiently be transmitted to the tow without any loss of a vertical component vector.

By configuring the main portion 32 of the tongue 26 lower than the base frame 12, the overall center of gravity of the vehicle 10 can be lowered, and the vehicle 10 can be made more stable. By configuring the vehicle 10 with the tongue 26 lower than the chassis 12, an additional purpose is served. As will be discussed hereinafter, the chassis 12 supports a carriage 34 for carrying the grain or particulate matter. In one embodiment of the invention, the vehicle 10 includes dump doors positioned at the bottom of the carriage 34 to effect gravity drain of the contents therein. It is, therefore, desirable to have the base frame or chassis 12 elevated at a height which permits an accumulation of the contents of the carriage 34, after being allowed to empty, on the ground beneath the vehicle 10. By raising the height of the frame 12, however, it frequently becomes vertically displaced from a height at which the hook-up on the towing tractor is disposed. By configuring the tongue 26 lower than the chassis 12, hook-up can be facilitated.

In embodiments as that shown in FIGS. 1-4, by rigidly mounting the tongue 26 to the base frame 12, hook-up can further be facilitated. Where pairs of wheels 22, 24 in tandem are used to mount the base frame 12, the frame 12 can be maintained in a particular orientation with respect to the ground. A rigid connection between the frame 12 and tongue 26 will afford a desired orientation to the tongue 26. The tongue 26 can thus be maintained elevated and spaced from the ground along its length. This feature, which can be characterized as "zero tongue weight", allows easy hook-up of the vehicle 10 to the powered towing vehicle since the tongue 26 need not be lifted off the ground to the height of the hook-up on the tractor.

The vehicle 10 further includes a carriage 34 mounted to the chassis 12. The carriage 34 includes a main body portion 36 which extends above the base frame 12 and an open discharge portion 38 which extends downwardly from the main body portion 36 between the support elements 14 of the chassis 12. The discharge portion 38 has an aperture 40 formed therethrough which provides free communication between the interior of the main body portion 36 and the environment beneath the vehicle 10. It is through this aperture 40 that the cargo in the vehicle 10 can be dumped by gravity drain in order to empty the vehicle 10.

A portion of the carriage wall is disposed obliquely with respect to the ground. In a preferred embodiment, two such obliquely disposed planar panels 42 can be configured in the main body portion 36 of the carriage 34. Typically, these panels 42 form a portion of the side walls of the main body portion 36. The periphery of the main body portion is completed by the front and rear walls 44, 46, each intersecting each of the side walls to form a generally rectangular structure as viewed in top plan.

The main body portion 36 can be constructed including two discrete bins 48. Such a construction facilitates the emptying of only a portion of the vehicle 10 while yet retaining a portion of the contents unemptied. Each bin 48 has a peripheral wall 50 enclosing the interior thereof. The two opposite side walls, including their obliquely disposed portions, can form a side wall common to both of the bins 48.

The vehicle can be constructed having any number of bins 48. The number would, of course, be dictated by the intended end use for the vehicle.

A generally horizontal panel 52 is fixedly positioned relative to an obliquely disposed portion 42 of the vehicle carriage 34. This panel 52 can be mounted to either the carriage 34 or the base frame 12 by welding or other suitable means. A generally horizontal panel 52 and oblique portion 42 of the carriage wall form an angular channel 54 therebetween. In embodiments wherein the vehicle 10 is used to carry grain, the angular channel 54 can serve as a catwalk for a grain sampler. The sampler can, thereby, be afforded access to the top 56 of the carriage 34 at least along the length of the horizontal panel 52. The panel 52 can, therefore, be made of a length so that access to virtually the full length of the vehicle's carriage 34 will be afforded.

In embodiments wherein either side wall of the carriage 34 includes an obliquely disposed portion 42, two generally horizontal panels 52 may be used with the vehicle 10 to provide two catwalks, one on either side of the vehicle 10. For appearance purposes, the vehicle 10 can be manufactured so that it is symmetrical.

The generally horizontal panels 52 can function secondarily as fenders in embodiments wherein the vehicle 10 is mounted for movement over the ground by means of wheels 22, 24. Mudguard retaining brackets 58 can be attached to the fenders 52 at points forward of and behind the wheels 22, 24. Such downwardly extending brackets 58 serve to maintain mudflaps 60 in positions to best effectuate containment of debris kicked up by the wheels 22, 24 within the wheel area.

In embodiments of the invention having an aperture 40 in the bottom of the bin or bins 48 for emptying of the vehicle 10 therethrough, an occlusion means slidably mounted across the aperture 40 can serve to preclude draining other than when emptying is specifically desired. Occlusion can be accomplished by use of a plate 62 sized larger than the discharge aperture 40 which can engage a lip 64 which forms the lower extremity of the discharge portion 38. Since a closure surface 66 of the plate 62 which engages the lip 74 is generally planar, the lip 64 forming the lower extremity of the discharge portion 38 can be constructed to define a first plane. A free surface 68 of the plate 62 facing away from the lip 64 runs on a track 70 which has a bearing surface 72 for engaging the free surface 68 of the plate 62 and maintaining the plate 62 in a second plane, parallel to and closely approximating the first plane. The plate 62 is thus maintained in a disposition slidably engaging the lip 64 of the discharge portion 38 of the carriage 34.

The track 70 can include two bearing elements 74 having two corresponding bearing surfaces 72 supporting the plate 52. The track bearing elements 74 can be supported either from a flange 76 extending horizontally outward from the lip 64 of the discharge portion 38 or from the chassis 12 of the vehicle 10. FIG. 5 illustrates an embodiment wherein a flange 76 has an appendage 78 extending therefrom to which the track support elements 74 can be mounted by bolt and nut arrangements 80.

By so suspending the occlusion member or plate 62, crevices or slots in which the plate 62 might be made to run can be eliminated. Consequently, chances of such crevices or slots becoming clogged by grain are precluded. The only surfaces exposed to the grain as it empties through the bottom of the carriage or hopper 34 are bearing surfaces 72 of the track 70 on which the plate 62 is made to run. These surfaces 72 are, however, cleaned by the plate 62 itself as it is made to slide back and forth on the track 70.

The invention can further include means for withdrawing the plate 62 along the track 70. One means as illustrated in FIGS. 5-7 includes at least one elongated retraction element 82 which extends from the plate 62 in the intended direction of withdrawal. The invention can so be constructed that the intended direction of withdrawal is toward the interconnecting member 18 of the base frame 12.

The elongated retraction element 82 has a first side 84 which faces toward the discharge aperture 40 in the direction from which grain or other particulate matter empties from the carriage 34. Chain means 86 are mounted to the second and opposite side 88 of the retraction element 82 and are thereby shielded from the particulate matter as it empties from the hopper 34. Clogging of a series of links 90 which comprise the chain means 86 is thereby prevented. A sprocket wheel 92 is mounted beneath the carriage 34 of the vehicle 10 with individual sprocket projections 94 of the wheel 92 engaging the links 90 of the chain means 86. The sprocket wheel 92 is rotatably mounted so that, upon rotation of the wheel 92, lateral motion is applied to the retraction element 82 and translated to the plate 62. Rotational motion can be imparted to the sprocket wheel 92 by a manual hand crank, an electric motor, or other suitable means.

A remote end 96, shown in phantom lines at 96', of the retraction element 82, or end opposite that by which the element 82 is mounted to the plate 62, can be spaced from the rear interconnecting member 18 of the base frame 12 when the plate 62 is in a position occluding the discharge aperture 40 so that it will abuttably engage the interconnecting member 18 when the hopper door 62 is open. The interconnecting member 18 can, thereby, serve as a stop for preventing withdrawal of the plate 62 beyond a point at which the discharge aperture 40 is fully open.

The invention incorporates means for maintaining the plate 62 in a position completely closed and completely occluding the discharge aperture 40 during filling of the carriage 34 with cargo and during transportation of that cargo. An acutely angled bracket 98 can be mounted to the discharge portion 38 of the carriage 34 proximate the lip 64 at the lower extremity thereof. The bracket 98 can be positioned so that, when the plate 62 is closed the plate 62 will be received and become wedged in the channel 100 formed by the bracket 98.

The invention can be equipped with complete highway safety lighting and braking systems. In embodiments in which the vehicle 10 is not powered and is to be towed by a tractor, the structure can be varied to accommodate towing hook-ups of the intended towing vehicle. The vehicle 10 can be constructed completely of steel to increase strength and durability. For aesthetic reasons, it can be painted a color similar to the intended towing vehicle.

Numerous characteristics and advantages of my invention have been set forth in the foregoing description. It will be understood, of course, that this disclosure is, in many respects, only illustrative. Changes may be made in details, particularly in matters of shape, size, and arrangement of parts. The scope of the invention is defined in the language of the appended claims.

What is claimed is:

1. An improved vehicle suitable for carrying grain and other particulate materials, comprising:
    a base frame including two laterally spaced, generally horizontal elongated support elements and an interconnecting member intersecting said laterally spaced support elements;
    means mounting said frame for movement over the ground;
    a carriage mounted to said frame and including a main body portion having a front wall, a rear wall, and two opposite side walls, each of said side walls including a planar portion extending obliquely with respect to the ground and upwardly and outwardly with respect to said body, and said carriage further including an open discharge portion extending downwardly from said main body portion between said support elements and spaced laterally from said interconnecting member and a lip forming a lower extremity of said discharge portion and defining a first plane, said discharge portion having formed therethrough a discharge aperture circumscribed by said lip providing communication between the interior of said main body portion and the exterior beneath said vehicle;
    a pair of parallel and generally horizontal fender panels, one of said pair fixedly positioned beneath each of said obliquely disposed planar portions of said side walls;
    a plate sized with respect to said discharge aperture such that it may completely obstruct said aperture, said plate having a closure surface engaging said lip of said discharge portion and a free surface;
    a track having a bearing surface engaging said free surface of said plate to maintain said plate in a second plane parallel to said first plane and engaging said lip;
    means for withdrawing said plate in said second plane along said track to open said discharge aperture; and
    an acutely angled bracket, mounted to said vehicle, into which said plate wedges when moved to a positioned occluding said discharge aperture, said bracket having an oblique surface to urge said plate against said lip as said plate is moved in a direction toward said bracket.

2. The vehicle of claim 1 wherein said frame mounting means comprises pairs of wheels in tandem.

3. The vehicle of claim 2 wherein each of said pairs of wheels straddles said base frame.

4. The vehicle of claim 1 futher comprising a motion transmission element rigidly mounted to said base frame and extending in a desired orientation therefrom.

5. The vehicle of claim 4 wherein said motion transmission element is spaced above the ground.

6. The vehicle of claim 5 wherein said base frame is mounted elevated with respect to the ground and said motion transmission means is disposed lower than said base frame.

7. The vehicle of claim 1 wherein said withdrawing means comprises:
    an elongated retraction element extending from said plate toward said interconnecting member, said retraction element having a first side facing toward said discharge aperture and a second side;
    chain means mounted to said second side of said retraction element, said chain means including a series of links;
    a sprocket wheel having individual sprocket projections, said sprocket wheel rotatably mounted to said vehicle with said sprocket projections engaging said links of said chain means; and
    means for imparting rotational motion to said sprocket wheel.

8. The vehicle of claim 7 wherein said retraction element has a remote end disposed to abuttably engage said interconnecting member when said plate is withdrawn a predetermined distance from a position occluding said discharge aperture.

* * * * *